United States Patent
Rapedius et al.

(10) Patent No.: US 10,358,071 B2
(45) Date of Patent: Jul. 23, 2019

(54) ADAPTER ARRANGEMENT FOR A VEHICLE SEAT AND VEHICLE SEAT

(71) Applicant: Adient Luxembourg Holding S.à.r.l., Luxembourg (LU)

(72) Inventors: Joerg Rapedius, Muenchweiler (DE); Peter Mueller, Mackenbach (DE); Richard Haensel, Flonheim (DE); Piotr Mizerski, Kaiserslautern (DE)

(73) Assignee: Adient Luxembourg Holding S.à.r.l., Luxembourg (LU)

(*) Notice: Subject to any disclaimer, the term of this patent is extended or adjusted under 35 U.S.C. 154(b) by 0 days.

(21) Appl. No.: 15/560,322

(22) PCT Filed: Mar. 24, 2016

(86) PCT No.: PCT/EP2016/056489
§ 371 (c)(1),
(2) Date: Sep. 21, 2017

(87) PCT Pub. No.: WO2016/156178
PCT Pub. Date: Oct. 6, 2016

(65) Prior Publication Data
US 2018/0056825 A1 Mar. 1, 2018

(30) Foreign Application Priority Data
Mar. 27, 2015 (DE) .................. 10 2015 205 660

(51) Int. Cl.
B60N 2/36 (2006.01)
B60N 2/90 (2018.01)
B60N 2/68 (2006.01)

(52) U.S. Cl.
CPC .............. *B60N 2/919* (2018.02); *B60N 2/36* (2013.01); *B60N 2/366* (2013.01); *B60N 2/682* (2013.01)

(58) Field of Classification Search
CPC .......... B60N 2/919; B60N 2/36; B60N 2/366; B60N 2/682
USPC ................. 297/463.1, 378.13, 378.12, 378.1
See application file for complete search history.

(56) References Cited

U.S. PATENT DOCUMENTS 7,740,317 B2 * 6/2010 Yamada ................ B60N 2/366
  296/65.17
8,905,475 B2 * 12/2014 Schenten ............ B60N 2/2245
  297/232
8,926,019 B2 * 1/2015 Lee ........................ B60N 2/366
  297/376

(Continued)

FOREIGN PATENT DOCUMENTS

CN       102470783 A    5/2012
CN       104271393 A    1/2015

(Continued)

*Primary Examiner* — Mark R Wendell
(74) *Attorney, Agent, or Firm* — McGlew and Tuttle, P.C.

(57) ABSTRACT

An adapter arrangement (100) for a vehicle seat (1) connects a locking unit (20) to a structural component (10) of the vehicle seat (1). The locking unit (20) includes a housing (22) and the adapter arrangement (100) supports the housing (22) in two opposite directions. The vehicle seat (1) has a structural component (10) and a locking unit (20) for locking the structural component (10) with a further component (30). The locking unit (20) is connected to the structural component (10) by the adapter arrangement (100).

20 Claims, 3 Drawing Sheets

(56) References Cited

U.S. PATENT DOCUMENTS

| | | | |
|---|---|---|---|
| 9,744,885 B2* | 8/2017 | Handl | B60N 2/682 |
| 9,937,822 B2* | 4/2018 | Pino | B60N 2/366 |
| 2008/0296948 A1* | 12/2008 | Tanaka | B60N 2/2245 |
| | | | 297/353 |
| 2012/0133188 A1* | 5/2012 | Wieclawski | B60N 2/2245 |
| | | | 297/378.13 |

FOREIGN PATENT DOCUMENTS

| | | |
|---|---|---|
| DE | 20 2005 004 094 U1 | 7/2005 |
| DE | 10 2012 011 515 A1 | 12/2013 |
| DE | 10 2014 202 239 B3 | 12/2014 |
| GB | 2 367 041 A | 3/2002 |
| JP | H09 104267 A | 4/1997 |

* cited by examiner

ADAPTER ARRANGEMENT FOR A VEHICLE SEAT AND VEHICLE SEAT

CROSS REFERENCE TO RELATED APPLICATIONS

This application is a United States National Phase Application of International Application PCT/EP2016/056489, filed Mar. 24, 2016, and claims the benefit of priority under 35 U.S.C. § 119 of German Application 10 2015 205 660.0, filed Mar. 27, 2015, the entire contents of which are incorporated herein by reference.

FIELD OF THE INVENTION

The invention relates to an adapter arrangement for a vehicle seat for connecting a locking unit to a structural component of the vehicle seat, wherein the locking unit has a housing. Furthermore, the invention relates to a vehicle seat.

BACKGROUND OF THE INVENTION

From DE 10 2012 011 515 A1 there is known a locking unit for a vehicle seat, comprising a pivoting latch for locking to a mating element designed as a bolt. The latch has a hook mouth to receive the bolt and a pawl which ensures a locked state of the locking unit in the event of a crash in that the latch is braced against a contact site on the pawl. Such locks have good locking strength when the direction of force is in the longitudinal direction, that is, perpendicular to an axis of rotation of the latch.

SUMMARY OF THE INVENTION

The problem which the invention addresses is to provide an adapter arrangement for fastening an aforementioned locking unit to a structural component of the vehicle seat that strengthens the locking unit, in particular strengthens the locking unit in a transverse direction, and also to provide a corresponding vehicle seat.

This problem is solved according to the invention by an adapter arrangement for a vehicle seat for connecting a locking unit to a structural component of the vehicle seat, wherein the locking unit has a housing, and the adapter arrangement braces the housing in two opposite directions.

Because the adapter arrangement braces the housing in two opposite directions, in particular, in and against a transverse direction, the locking unit is more robust. The adapter arrangement according to the invention enables a greater load capacity of the locking unit thanks to bracing the housing against the adapter arrangement. Furthermore, a latch and/or a pawl can be braced against the adapter arrangement with the housing in between them. This increases the loading capacity of the locking unit, especially for sideways loads. The risk of a sideways buckling of latch and pawl is reduced. As compared to a known fastening of the locking unit in the prior art, where the housing is screwed to the side of the structural component, the locking unit can have a smaller and lighter design, for the same strength in the mounted state.

The housing can be single-piece. The housing may comprise two housing parts. The housing may comprise multiple housing parts. The housing may be enclosed. The housing may be largely enclosed. The housing may be largely open. The housing may be a simple carrier plate. The housing may be a simple carrier plate with spacer bolts. Accordingly, the term housing encompasses all components which are suitable to contain and/or stow moving parts of a locking device, especially bolts serving as axes of rotation. The housing assures the mounting of the locking device as a functional unit.

Preferably, the adapter arrangement comprises at least two adapter parts, most preferably precisely two adapter parts. The two adapter parts can in this way be formed easily and cheaply. As compared to a single-part adapter arrangement, the two adapter parts are easier to manufacture, especially as bent metal sheets.

The locking unit is preferably screwed together with the adapter arrangement. The locking unit is preferably screwed together with two adapter parts of the adapter arrangement. Such a screwing of the locking unit connects the adapter parts to a clasp. In this way, the connection of the locking unit to the structural component is strong and rigid. If the structural component is a backrest and the mating element is secured to the vehicle body, the backrest can channel large forces into the vehicle body in the transverse direction. A so-called cable pull effect occurs in the transverse direction.

Preferably, the adapter arrangement is welded to the structural component. Alternatively, the adapter arrangement can be screwed, riveted, and/or glued together with the structural component. Basically all known joining methods are suitable for connecting the adapter arrangement to the structural component.

The adapter arrangement is preferably made of a high-strength material, such as metal, sheet metal, steel sheet or a composite material. Steel sheet of alloy S355MC or S700MC is especially suitable.

The structural component may be a backrest structure, which can be locked by means of the locking unit to a vehicle body or another component of the vehicle seat. The structural component may be a seat base structure of a seat portion of the vehicle seat, which can be locked by means of the locking unit to a vehicle floor or another structural component of the vehicle seat. By a seat base structure is meant in particular the load-bearing structure of a seat portion of the vehicle seat.

Preferably, the adapter arrangement has an opening through which the mating element can enter into the locking unit.

Preferably, the adapter arrangement is dimensioned such that the locking unit, looking in the longitudinal direction, is arranged alongside the structural component. In this way, bending moments between the locking unit and the structural component are largely reduced.

The problem is furthermore solved by a vehicle seat with a structural component and a locking unit for locking the structural component to another component, especially to a mating element secured to a vehicle structure, wherein the locking unit is connected by means of an adapter arrangement according to the invention to the structural component.

The mating element may be a bent wire. The mating element may be a clip. The mating element may be a bolt.

The problem is furthermore solved by a vehicle seat with a structural component and a locking unit for locking the structural component to another component, wherein the locking unit is connected by means of an adapter arrangement according to the invention to the structural component.

The invention is explained more closely below with the aid of advantageous exemplary embodiments shown in the figures. However, the invention is not confined to these exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
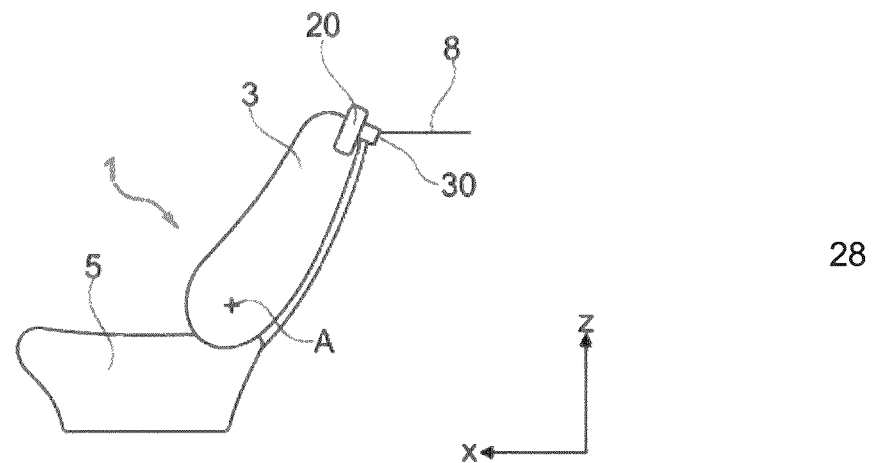
FIG. 1 is a schematic side view of a vehicle seat and a portion of a vehicle body.

Referring to the drawings, FIG. 1 shows a vehicle seat 1, which in the present case is designed as a 2/3 seat of a rear seat system divided as 1/3:2/3. The vehicle seat 1 comprises a backrest 3 and a seat portion 5.

The vehicle seat 1 shall be described below with the use of three spatial directions running perpendicular to each other. A longitudinal direction x runs for the most part horizontally in a vehicle seat 1 installed in the vehicle and preferably parallel to a vehicle longitudinal direction, corresponding to the usual travel direction of the vehicle. A transverse direction y running perpendicular to the longitudinal direction x is likewise oriented horizontally in the vehicle and runs parallel to a vehicle transverse direction. A vertical direction z runs perpendicular to the longitudinal direction x and perpendicular to the transverse direction y. For a vehicle seat 1 installed in the vehicle, the vertical direction z runs parallel to the vehicle's vertical axis.

The positional and directional indications used, such as front, rear, top, bottom, pertain to a viewing direction of a passenger seated in the vehicle seat 1 in a normal sitting position, the vehicle seat 1 being installed in the vehicle, in a position of use suitable for passenger transport, with upright backrest 3 and oriented as usual in the direction of travel. However, the vehicle seat 1 according to the invention may also be installed in a different orientation, for example transversely to the direction of travel.

Figure 2:
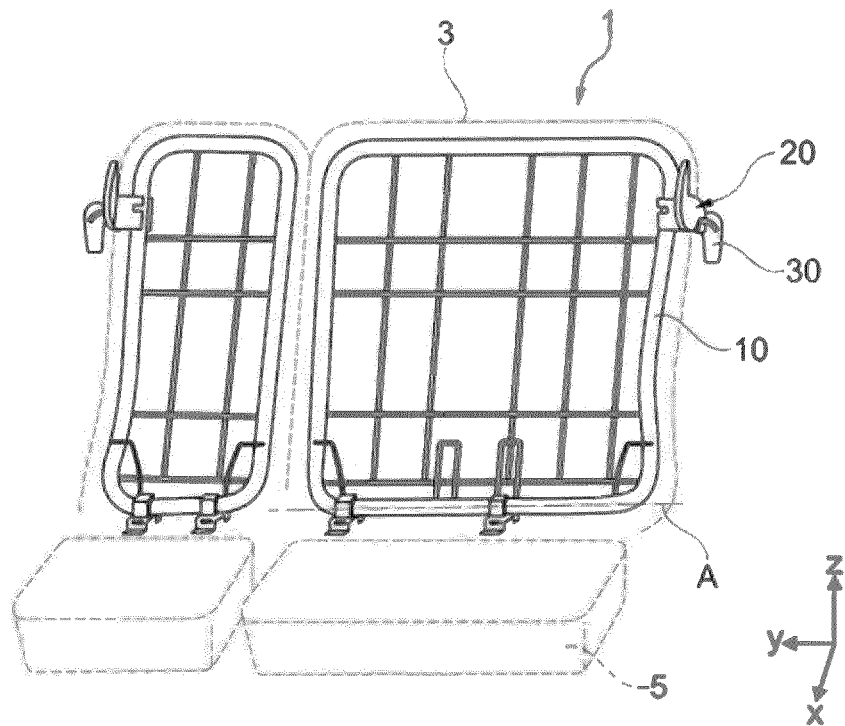
FIG. 2 is a schematic perspective view of a vehicle seat known from the prior art, divided in a ratio of 1/3:2/3.

FIG. 2 shows a vehicle seat 1 which is generally known from the prior art and a comparably constructed 1/3 seat of a divided rear seat system. The backrest 3 comprises, as structural component, a backrest structure 10, which carries a cushion. The backrest structure 10 in the present case is designed as a tubular frame structure. The backrest 3 can pivot about a backrest pivot axis A running parallel to the transverse direction y, so that the backrest 3 can be folded onto the sitting portion 5. In an upright position of the backrest 3 suitable for passenger transport, it may be locked by means of a locking unit 20 to a mating element 30 secured to the vehicle body 8, in the present case a locking clip made from a bent wire.

The locking unit 20 may be a familiar latch lock, whose individual parts are largely arranged in a housing 22. Such a locking unit 20 is known for example from DE 10 2012 011 515 A1, whose disclosure content regarding the basic layout of such a locking unit is expressly incorporated and shall be described below in summary fashion with reference to FIG. 3.

Figure 3:
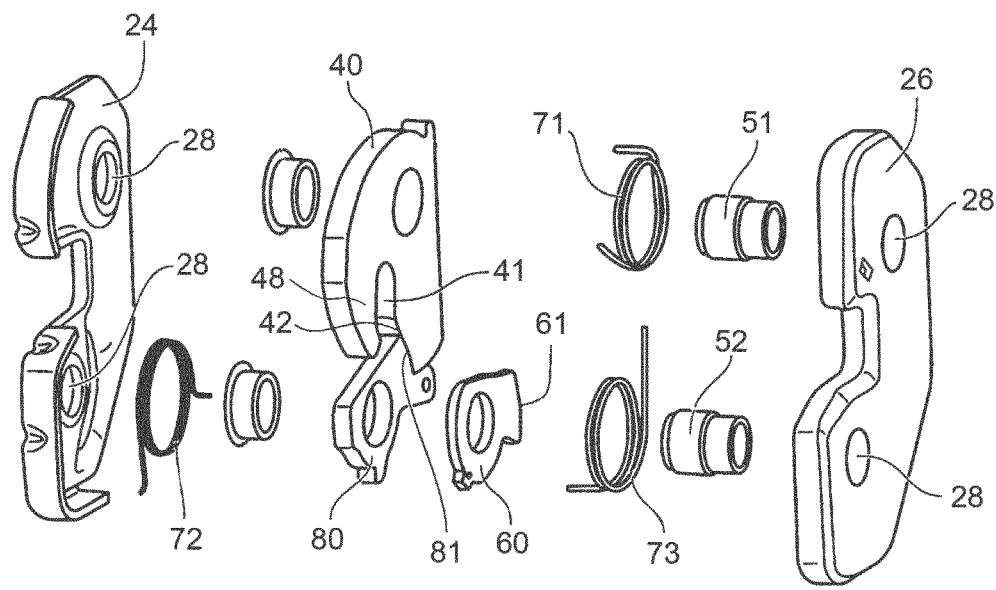
FIG. 3 is and exploded view of a locking device known from the prior art.

FIG. 3 shows a locking unit 20 known from the prior art, for which an adapter arrangement 100 according to the invention as described more closely below serves to connect it to a structural component, in the present case to the backrest structure 10. The locking unit 20 may also be used in other locations, for example to fasten the sitting portion 5 of the vehicle seat 1 to a floor structure of the motor vehicle or in a door lock. The adapter arrangement 100 according to the invention is not confined to this embodiment of the locking unit 20.

The locking unit 20 comprises a housing 22, which has a first side plate 24 and a second side plate 26. The base surfaces of the side plates 24, 26 are largely flat in the present case and arranged in a plane defined by the longitudinal direction x and the vertical direction z, i.e., perpendicular to the transverse direction y. The base surfaces are bordered for a section by a flange standing off at right angles. Each of the side plates 24, 26 comprises two bearing bores 28, which are circular round in the present case.

The first side plate 24 and the second side plate 26 form a receptacle, which opens in the direction of the mating element 30 in order to be able to receive it for the locking process. The section of the mating element 30 received by the receptacle runs horizontally in the transverse direction y.

A latch 40 is pivotably mounted on a first bearing bolt 51, which in turn is fastened to the first side plate 24 and to the second side plate 26. The latch 40 has a hook mouth 41 for interacting with the mating element 30. By means of a spring 71, the latch 40 is biased in the opening direction. On a second bearing bolt 52 there is pivotably mounted a clamping element 60. By means of another spring 73, the clamping element 60 is biased toward the latch 40. On the second bearing bolt 52, furthermore, there is arranged a pawl 80 axially alongside the clamping element 60 and likewise pivotably mounted on the second bearing bolt 52, i.e., flush with the clamping element 60. By means of yet another spring 72 the pawl 80 is biased toward the latch 40. The pawl 80 and the clamping element 60 are driven together with an idle path, for example by means of a tongue and groove guide or by means of an axially projecting dog.

In the locked state, when the hook mouth 41 of the latch 40 receives the mating element 30, the clamping element 60 by virtue of the biasing by the other spring 73 as a securing element exerts a closing torque on the latch 40. For this, the clamping element 60 has a clamping surface 61 curved eccentrically to the second bearing bolt 52, which is in non-self-locking contact with the functional surface 42 of the latch 40. The pawl 80 has a detent surface 81, which is in the vicinity of the clamping surface 61 of the clamping element 60. In the locked state, the detent surface 81 is positioned at a spacing from the functional surface 42 of the latch 40. The detent surface 81 in the present case is curved in a circular arc and convex in configuration, but it can also be flat.

In the locked state between the locking unit 20 and the mating element 30 the mating element 30 lies in the hook mouth 41 against a lug 48 of the latch 40. Under heavy loading, the latch 40 experiences an opening torque due to the mating element 30 and pushes the clamping element 60 away. As a result, the detent surface 81 of the pawl 80 at first comes to bear against the functional surface 42 of the latch 40. Thus, the pawl 80 serves to brace the latch 40 and acts as a securing element to prevent a further rotation of the latch 40 in the opening direction. In this way, the pawl 80 prevents an opening of the latch 40.

Figure 4:
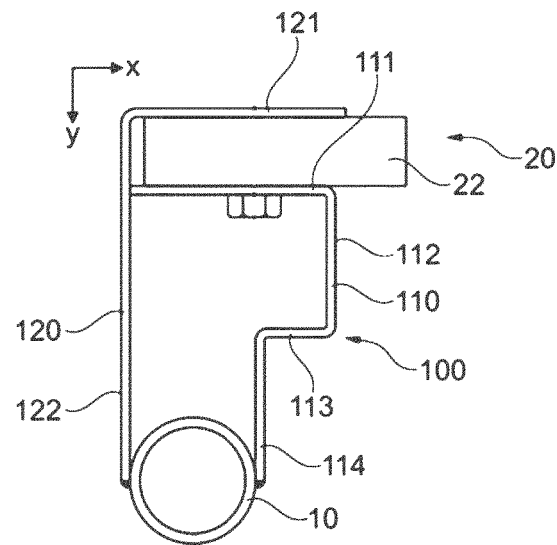
FIG. 4 is a schematic sectional representation showing a first exemplary embodiment of an adapter arrangement according to the invention, with mounted locking unit and a portion of a backrest structure.
Figure 5:
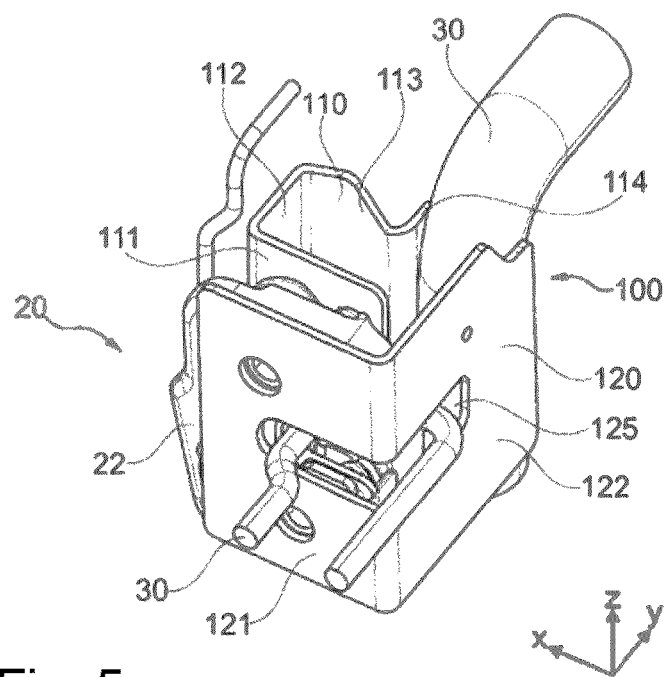
FIG. 5 is a perspective representation showing a second exemplary embodiment of an adapter arrangement according to the invention, with mounted locking unit and a portion of a backrest structure, as well as a mating element.
Figure 6:
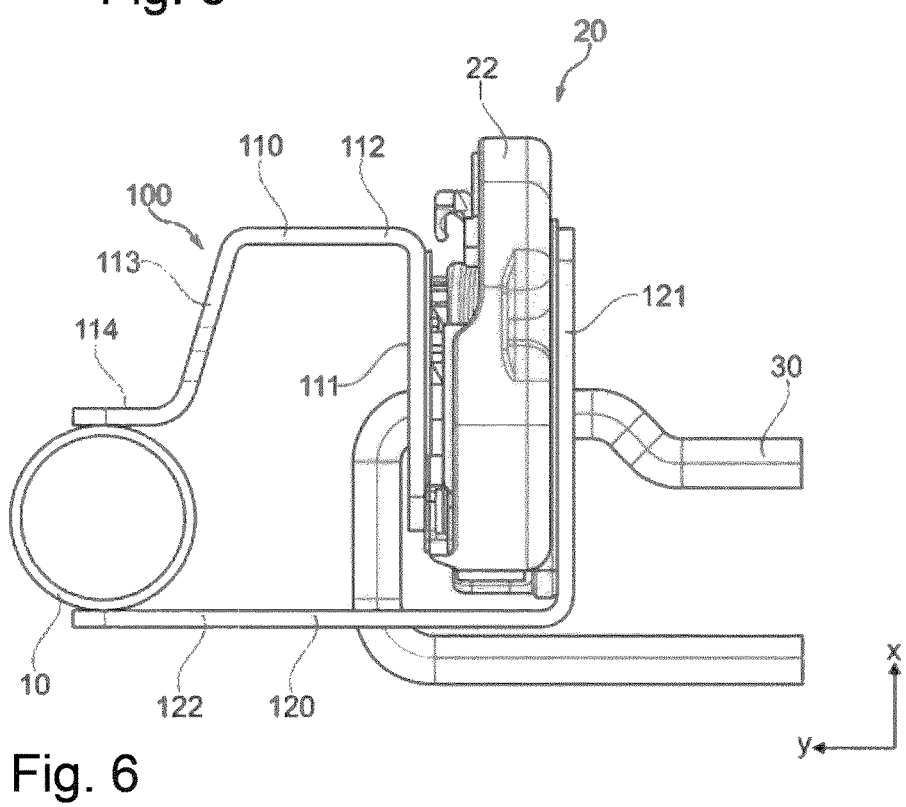
FIG. 6 is a sectional representation showing a third exemplary embodiment of an adapter arrangement according to the invention, with mounted locking unit and a portion of a backrest structure, as well as a mating element.

FIGS. 4 to 6 show three exemplary embodiments of an adapter arrangement 100 according to the invention. The locking unit 20 each time is firmly connected by means of the adapter arrangement 100 to the backrest structure 10. The three exemplary embodiments are based on the same fundamental principle, which is described below.

The adapter arrangement 100 comprises a first adapter part 110 and a second adapter part 120. In the present case, the adapter arrangement 100 is connected to the backrest structure 10, especially by welding. The housing 22 of the locking unit 20 is braced in two opposite directions, in the present case, in and against the transverse direction y. The housing 22 is arranged in the transverse direction y between the first adapter part 110 and the second adapter part 120. The first adapter part 110 and the second adapter part 120 strengthen the housing 22 of the locking unit 20. In this way, the loading capacity of the locking unit 20, especially in the transverse direction y, is substantially increased. The adapter arrangement 110 prevents a buckling of latch 40, clamping element 60 and pawl 80 under forces acting on the latch 40 in the transverse direction y by way of the mating element 30.

FIG. 4 shows a first exemplary embodiment of an adapter arrangement 100 according to the invention. The first adapter part 110 is a triple bent metal sheet. Thanks to the three bends, the first adapter part 110 has four sections which are for the most part flat.

A first section 111 of the first adapter part 110 runs perpendicular to the transverse direction y and thus parallel to the side plates 24, 26 of the housing 22. The first section 111 is arranged between the backrest structure 10 and the locking unit 20 in the transverse direction y. The first section 111 is arranged at a spacing from the backrest structure 10 in the transverse direction y. The locking unit 20 lies against the first section 111 on a side of the first section 111 facing away from the backrest structure 10. The housing 22 of the locking unit 20 lies against the first section 111 on a side of the first section 111 facing away from the backrest structure 10.

A second section 112 of the first adapter part 110 adjoins the first section 111 at right angles and runs in the transverse direction y toward the backrest structure 10.

A third section 113 of the first adapter part 110 adjoins the second section 112 at right angles and runs perpendicular to the transverse direction y. The first section 111, the second section 112 and the third section 113 form a U-shape which is open against the direction of travel.

A fourth section 114 of the first adapter part 110 adjoins the third section 113 at right angles and runs in the transverse direction y toward the backrest structure 10. The fourth section 114 lies against the backrest structure 10 and is welded to the backrest structure 10.

The second adapter part 120 is an L-shaped bent metal sheet. Thanks to a bending, the second adapter part 120 has two regions 121, 122, which are for the most part flat.

A first region 121 of the second adapter part 120 runs perpendicular to the transverse direction y and thus parallel to the side plates 24, 26 of the housing 22. The first region 121 lies against the housing 22 of the locking unit 20 on its side facing away from the backrest structure 10 in the transverse direction y. The first region 121 is arranged spaced apart from the backrest structure 10 in the transverse direction y. The first region 121 of the second adapter part 120 and the first section 111 of the first adapter part 110 are spaced apart from each other in the transverse direction y. The clear width between the first region 121 and the first section 111 corresponds to the dimension of the locking unit 20 in the transverse direction y. The housing 22 of the locking unit 20 is arranged between the first region 121 and the first section 111 and thereby fixed in the transverse direction y. The housing 22 is screwed together with the first section 111 and preferably also with the first region 121. Preferably, the screws run through the bearing bolts 51, 52 of the locking unit 20, which are fashioned as hollow bolts. In the first region 121 of the second adapter part 120, through holes can be provided for these screws, and in the first section 111 of the first adapter part 120 threads are provided for screwing in these screws.

A second region 122 of the second adapter part 120 adjoins the first region 121 at right angles and runs in the transverse direction y toward the backrest structure 10. The second region 122 lies against the backrest structure 10 and is welded to it.

The first region 121 and the second region 122 each have a slot-like partial opening, which are joined together to form an opening and allow the mating element 30 to enter into the locking unit 20.

The locking unit 20 is arranged so that a contact site between the latch 40 of the locking unit 20 and the mating element 30 has approximately the same position in the longitudinal direction x as the backrest structure 10 at the height of the locking unit 20.

FIG. 5 shows a second exemplary embodiment of an adapter arrangement 100 according to the invention. The second exemplary embodiment corresponds to the first exemplary embodiment except for different dimensions. The same parts are given the same reference numbers. The first region 121 and the second region 122 each have a slot-like partial opening, which are joined together to form an opening 125.

FIG. 6 shows a third exemplary embodiment of an adapter arrangement 100 according to the invention. The third exemplary embodiment corresponds to the first exemplary embodiment except for different dimensions and slightly different angles between the sections 112, 113, 114 of the first adapter part 110. The same parts are given the same reference numbers.

The features disclosed in the above specification, the claims, and the drawings may be significant either alone or in combination for the realization of the invention in its different embodiments. Although the invention has been described in detail in the drawings and the preceding presentation, the presentations are to be understood as being illustrative and exemplary and not limiting. In particular, the choice of the drawn proportions of the individual elements should not be interpreted as being necessary or restrictive. Furthermore, the invention in particular is not confined to the exemplary embodiments discussed. Other variants of the invention and its embodiment will emerge to the skilled person from the preceding disclosure, the figures, and the claims. While specific embodiments of the invention have been shown and described in detail to illustrate the application of the principles of the invention, it will be understood that the invention may be embodied otherwise without departing from such principles.

Terms used in the claims such as "comprise", "have", "contain" and the like do not rule out other elements or steps. The use of the indefinite article does not rule out the plural. A single device may perform the functions of several units or devices mentioned in the claims.

The invention claimed is:

1. An adapter arrangement for a vehicle seat for connecting a locking unit to a structural component of the vehicle seat, wherein the locking unit has a housing and the adapter arrangement braces the housing in two opposite directions, the adapter arrangement comprising:
a first adapter part; and
a second adapter part, wherein:
the housing is arranged in the transverse direction between the first adapter part and the second adapter part; and
the adapter arrangement braces the housing in a transverse direction and against motion in a transverse direction.

2. The adapter arrangement as claimed in claim 1, wherein the adapter arrangement comprises precisely two adapter parts, wherein the two adapter parts do not form a part of the housing of the locking unit.

3. The adapter arrangement as claimed in claim 1, wherein at least one adapter part of the adapter arrangement is a bent metal sheet.

4. The adapter arrangement as claimed in claim 1, wherein the adapter arrangement can be screwed together with the locking unit, the adapter arrangement being a structure that is separate from the housing of the locking unit.

5. The adapter arrangement as claimed in claim 1, wherein the two adapter parts are screwed to a clasp, the first adapter part and the second adapter part defining an adapter structure, the adapter structure surrounding three sides of the housing of the locking unit.

6. The adapter arrangement as claimed in claim 5, wherein in a first region of the second adapter part at least one through hole is provided for a screw and in a first section of the first adapter part at least one thread is provided opposite the through hole in the transverse direction for screwing in the screw.

7. The adapter arrangement as claimed in claim 6, wherein the at least one screw can be led through a bearing bolt of the locking unit fashioned as a hollow bolt.

8. The adapter arrangement as claimed in claim 1, wherein the adapter arrangement has an opening through which a mating element can interact with a latch of the locking device, the housing comprising a first housing part and a second housing part, at least a portion of the first adapter part being located opposite the first housing part, at least a portion of the second adapter part being located opposite the second housing part.

9. A vehicle seat comprising:
a structural component;
a locking unit for locking the structural component to another component, the locking unit comprising a housing;
an adapter arrangement, wherein the locking unit is connected by means of the adapter arrangement to the structural component, the adapter arrangement comprising:
a first adapter part; and
a second adapter part, wherein:
the housing is arranged in the transverse direction between the first adapter part and the second adapter part; and
the adapter arrangement braces the housing in a transverse direction and against motion in a transverse direction.

10. The vehicle seat as claimed in claim 9, wherein the adapter arrangement is welded to the structural component.

11. The vehicle seat as claimed in claim 9, wherein the structural component is a structure of a backrest of the vehicle seat.

12. The vehicle seat as claimed in claim 9, wherein the structural component is a seat base structure of the vehicle seat.

13. The vehicle seat as claimed in claim 9, wherein the other component is a mating element secured to a vehicle body.

14. The vehicle seat as claimed in claim 9, wherein at least one adapter part of the adapter arrangement is a bent metal sheet, wherein the first adapter part and the second adapter part do not form a part of the housing of the locking unit.

15. The vehicle seat as claimed in claim 9, wherein the adapter arrangement is screwed together with the locking unit, the adapter arrangement being a structure that is separate from the housing of the locking unit.

16. The vehicle seat as claimed in claim 9, wherein the two adapter parts are screwed to a clasp, the first adapter part and the second adapter part defining a housing receiving space, at least a portion of the housing being arranged in the housing receiving space, the housing comprising a first housing part and a second housing part, the first housing part comprising a first housing outer surface, the second housing part comprising a second housing part outer surface, the first housing outer surface being located opposite one of the first adapter part and the second adapter part, the second housing outer surface being located opposite another one of the first adapter part and the second adapter.

17. The vehicle seat as claimed in claim 16, wherein:
in a first region of the second adapter part at least one through hole is provided for a screw and in a first section of the first adapter part at least one thread is provided opposite the through hole in the transverse direction with the screw received therein;
the first housing outer surface is adjacent to at least a portion of one of the first adapter part and the second adapter part;
the second housing outer surface is located adjacent to at least a portion of another one of the first adapter part and the second adapter part; and
the at least one screw is led through a bearing bolt of the locking unit fashioned as a hollow bolt.

18. The vehicle seat as claimed in claim 17, wherein the adapter arrangement has an opening through which a mating element interacts with a latch of the locking device, the first housing outer surface engaging the portion of the one of the first adapter part and the second adapter part, the second housing outer surface engaging the portion of the another one of the first adapter part and the second adapter part, the first housing part and the second housing part defining a housing interior space, wherein at least a portion of a latch is arranged in the housing interior space.

19. An adapter arrangement for a vehicle seat for connecting a locking unit to a structural component of the vehicle seat, wherein the locking unit has a housing and the adapter arrangement braces the housing in two opposite directions, the adapter arrangement comprising:
a first adapter part; and
a second adapter part, the housing being arranged in the transverse direction between the first adapter part and the second adapter part, the housing comprising a first housing part and a second housing part, the first housing part being located opposite the second housing part in the transverse direction, one of the first adapter part and the second adapter part being located adjacent to one of the first housing part and the second housing part, another one of the first adapter part and the second adapter part being located adjacent to another one of the first housing part and the second housing part, wherein the adapter arrangement braces the housing in a transverse direction and against motion in a transverse direction.

20. The adapter arrangement as claimed in claim 19, wherein the one of the first adapter part and the second adapter part is in direct contact with the one of the first housing part and the second housing part, the another one of the first adapter part and the second adapter part being in direct contact with the another one of the first housing part and the second housing part.

* * * * *